US011405594B2

(12) United States Patent
Lee (10) Patent No.: US 11,405,594 B2
(45) Date of Patent: Aug. 2, 2022

(54) METHOD FOR DETECTING EVENT OF OBJECT BY USING WEARABLE DEVICE AND MANAGEMENT SERVER OPERATING SAME

(71) Applicant: INHANDPLUS INC., Pohang-si (KR)

(72) Inventor: Hwiwon Lee, Seoul (KR)

(73) Assignee: INHANDPLUS INC., Pohang-si (KR)

( * ) Notice: Subject to any disclaimer, the term of this patent is extended or adjusted under 35 U.S.C. 154(b) by 0 days.

(21) Appl. No.: 17/051,436

(22) PCT Filed: Jan. 25, 2019

(86) PCT No.: PCT/KR2019/001118
§ 371 (c)(1),
(2) Date: Oct. 29, 2020

(87) PCT Pub. No.: WO2019/212122
PCT Pub. Date: Nov. 7, 2019

(65) Prior Publication Data
US 2021/0058590 A1 Feb. 25, 2021

(30) Foreign Application Priority Data
Apr. 30, 2018 (KR) .......................... 10-2018-0049765

(51) Int. Cl.
*H04N 7/18* (2006.01)
*H04W 4/80* (2018.01)
(Continued)

(52) U.S. Cl.
CPC ............... *H04N 7/188* (2013.01); *G06T 7/20* (2013.01); *H04N 7/185* (2013.01); *H04W 4/021* (2013.01);
(Continued)

(58) Field of Classification Search
CPC ........ H04N 7/188; H04N 7/185; H04N 5/225; H04N 5/232; H04N 5/77; H04N 21/422;
(Continued)

(56) References Cited

U.S. PATENT DOCUMENTS 10,025,908 B1 * 7/2018 Orellano ................ G16H 40/63
2015/0215443 A1 7/2015 Heo et al.
(Continued)

FOREIGN PATENT DOCUMENTS

JP 2004-280376 A 10/2004
JP 2015-126451 A 7/2015
(Continued)

OTHER PUBLICATIONS

International Search Report for PCT/KR2019/001118 dated May 8, 2019 from Korean Intellectual Property Office.
(Continued)

*Primary Examiner* — Michael E Teitelbaum
(74) *Attorney, Agent, or Firm* — Revolution IP, PLLC (57) ABSTRACT

A wearable device according to various embodiments of the present invention is a wearable device wearable on a user's body, and may include a short-range communication module that recognizes the user's body and an object positioned within a predetermined area, a camera module that photographs an area adjacent to the wearable device to generate an image or a video related to at least one of movement of the user's body or the object, a control unit that determines whether or not to activate the camera module based on object information recognized through the short-range communication module, and a communication module that transmits information on the object recognized through the short-range communication module and the image or the video generated through the camera module to a management server.

10 Claims, 7 Drawing Sheets (51) Int. Cl.
*G06T 7/20* (2017.01)
*H04W 4/021* (2018.01)

(52) U.S. Cl.
CPC ..... *H04W 4/80* (2018.02); *G06T 2207/10016* (2013.01); *G06T 2207/20081* (2013.01); *G06T 2207/30196* (2013.01)

(58) Field of Classification Search
CPC .. H04N 5/2257; H04N 21/42201; G06T 7/20; G06T 2207/10016; G06T 2207/20081; G06T 2207/30196; H04W 4/021; H04W 4/80; G06K 9/00342; G06N 20/00
See application file for complete search history.

(56) References Cited

U.S. PATENT DOCUMENTS

| | | |
|---|---|---|
| 2015/0216413 A1 | 8/2015 | Soyao et al. |
| 2015/0363570 A1 | 12/2015 | Hanina et al. |
| 2016/0027284 A1 | 1/2016 | Kamp et al. |
| 2016/0287166 A1 | 10/2016 | Tran |
| 2016/0306932 A1 | 10/2016 | Fateh et al. |
| 2016/0354283 A1 | 12/2016 | Cho et al. |
| 2017/0004283 A1* | 1/2017 | Lewis ............... G16H 20/10 |
| 2017/0111565 A1 | 4/2017 | Shibahara et al. |
| 2018/0077335 A1 | 3/2018 | Lee et al. |
| 2018/0132783 A1* | 5/2018 | Wang ............... A61B 5/14546 |
| 2019/0065970 A1 | 2/2019 | Bonutti et al. |
| 2019/0385717 A1 | 12/2019 | Guan et al. |
| 2021/0058590 A1 | 2/2021 | Lee |

FOREIGN PATENT DOCUMENTS

| | | |
|---|---|---|
| JP | 2015-197803 A | 11/2015 |
| JP | 2016-091567 A | 5/2016 |
| JP | 2017-169732 A | 9/2017 |
| JP | 2019-213886 A | 12/2019 |
| KR | 10-2014-0063652 A | 5/2014 |
| KR | 10-2015-0088599 A | 8/2015 |
| KR | 10-2016-0008448 A | 1/2016 |
| KR | 10-2016-0071013 A | 6/2016 |
| KR | 10-2016-0099435 A | 8/2016 |
| KR | 10-2016-0104288 A | 9/2016 |
| KR | 10-2016-0108051 A | 9/2016 |
| KR | 10-2016-0120131 A | 10/2016 |
| KR | 10-2017-0054861 A | 5/2017 |
| KR | 10-2017-0084657 A | 7/2017 |
| KR | 10-2017-0112704 A | 10/2017 |
| KR | 10-1798890 B1 | 11/2017 |
| KR | 10-2018-0028701 A | 3/2018 |
| KR | 10-2018-0054453 A | 5/2018 |
| KR | 10-2018-0084576 A | 7/2018 |
| KR | 10-1949102 B1 | 2/2019 |
| KR | 10-2019-0067686 A | 6/2019 |
| KR | 10-2019-0125143 A | 11/2019 |
| KR | 10-2019-0126773 A | 11/2019 |
| KR | 10-2020-0080047 A | 7/2020 |

OTHER PUBLICATIONS

International Search Report of PCT/KR2019/001118 dated May 8, 2019.
Writtent opinion of PCT/KR2019/001118 dated May 8, 2019.
International Search Report of PCT/KR2020/006008 dated Aug. 24, 2020.
Written opinion of PCT/KR2020/006008 dated Aug. 24, 2020.
Office Action of KR Application No. 10-2019-7023063 dated Feb. 6, 2020.
Office Action of KR Application No. 10-2019-7023063 dated Apr. 17, 2020.
Office Action of KR Application No. 10-2019-7023063 dated Sep. 1, 2020.
Notice of Allowance of KR Application No. 10-2019-7023063 dated Sep. 28, 2020.
Office Action of KR Application No. 10-2020-7029786 dated Feb. 5, 2021.
Office Action of KR Application No. 10-2021-0040855 dated Jun. 14, 2021.
Office Action of KR Application No. 10-2021-0039622 dated Jun. 17, 2021.
Office Action of KR Application No. 10-2021-0040853 dated Jun. 23, 2021.
Office Action of KR Application No. 10-2021-0040854 dated Jun. 23, 2021.
Office Action of KR Application No. 10-2020-7013576 dated Jun. 30, 2021.
Office Action of U.S. Appl. No. 17/356,528 dated Oct. 13, 2021.
Notice of Allowance of U.S. Appl. No. 17/358,116 dated Nov. 8, 2021.
Haik Kalantarian et al. "A Wearable Sensor System for Medication Adherence Prediction", Artificial Intelligence in Medicine, vol. 69, May 2016, pp. 43-52.
International Search Report of PCT/KR2021/011033 dated Dec. 7, 2021.
Written Opinion of PCT/KR2021/011033 dated Dec. 7, 2021.
International Search Report of PCT/KR2021/011057 dated Dec. 7, 2021.
Written Opinion of PCT/KR2021/011057 dated Dec. 7, 2021.
Office Action of U.S. Appl. No. 17/518,615 dated Jan. 13, 2022.
Office Action of KR Application No. 10-2021-0186342 dated Jan. 19, 2022.
Office Action of U.S. Appl. No. 17/356,528 dated Jan. 26, 2022.
Office Action of JP Application No. 2020-560911 dated Feb. 1, 2022.
Office Action of KR Application No. 10-2021-7035878 dated Feb. 8, 2022.

* cited by examiner

METHOD FOR DETECTING EVENT OF OBJECT BY USING WEARABLE DEVICE AND MANAGEMENT SERVER OPERATING SAME

TECHNICAL FIELD

Various embodiments of the present invention relate to a technique for more simply detecting an event of an object by using a wearable device that a user can wear.

BACKGROUND ART

In daily life, a user performs numerous physical activities without his or her awareness. In particular, these physical activities are accompanied by a significant part of events that move a specific object, but it is not easy for the user to remember each and every events occurring in a habitual pattern and unconscious area of a user.

Sometimes, the user's physical activity that accompanies movement of the object may be decided as an important event in several areas. For example, in a field such as healthcare, how much medicine the user ingested per day may be an important factor, and in the case of a specific disease, not omission of drug administration may be a very important issue.

The problem is that when such an important event is omitted, the user is not aware of this in most cases in his/her daily life. Even if the user is aware of this lately, there is a limitation in that it is not possible to retroactively reduce a loss or risk due to failure to perform the event in time.

Recently, a technique for analyzing a user's activity using a camera, etc. has been disclosed, but in most cases, it is limited to a fixed installation type camera, and there is a problem that it is difficult to incorporate the technique into daily life.

DISCLOSURE OF THE INVENTION

Technical Problem

An object of various embodiments of the present invention is to provide various services by recognizing a specific object relatively simply in daily life through a wearable device and its configuration to determine whether a predetermined event occurs and recording an event occurrence time.

The problems to be solved by the present invention are not limited to the problems mentioned above, and other problems that are not mentioned will be clearly understood by those skilled in the art from the following description.

Technical Solution

A wearable device according to various embodiments of the present invention for solving the problem described above is a wearable device wearable on a user's body, and may include a short-range communication module that recognizes the user's body and an object positioned within a predetermined area, a camera module that photographs an area adjacent to the wearable device to generate an image or a video related to at least one of movement of the user's body or the object, a control unit that determines whether or not to activate the camera module based on object information recognized through the short-range communication module, and a communication module that transmits information on the object recognized through the short-range communication module and the image or the video generated through the camera module to a management server.

A management server according to an embodiment of the present invention is a management server that acquires information through communication with a wearable device wearable on a user's body and manages the acquired information, and may include a communication unit that receives information of an object recognized through a short-range communication module of the wearable device and receives an image or a video generated through the wearable device, and a motion determination unit that determines, based on machine learning or artificial intelligence, whether a preset motion related to the object or the user's body is detected on the image or the video based on the information of the object.

A method for detecting an event according to an embodiment of the present invention is a method for detecting, by a management server, an event of an object through information collected by a wearable device, and may include receiving information of an object recognized through a short-range communication module of the wearable device and receiving an image or a video generated through the wearable device, determining, based on machine learning or artificial intelligence, whether a preset motion related to the object or the user's body is detected on the image or the video based on the information of the object, and determining whether or not a specific event occurs by aggregating weights set for each of the preset motions detected as at least one or more.

Advantageous Effects

According to an embodiment of the present invention, by recording whether or not a specific event occurs and an occurrence time by a wearable device, a more efficient guide system can be provided by detecting an event of a user that is likely to be omitted in a field of daily life such as healthcare, and a system capable of analyzing data by learning a user pattern, etc. can be implemented.

The effects of the present invention are not limited to the effects mentioned above, and other effects not mentioned will be clearly understood by those skilled in the art from the following description.

MODE FOR CARRYING OUT THE INVENTION

The terms used in this specification are for describing embodiments and are not intended to limit the present invention. In this specification, the singular form also includes the plural form unless specifically stated in the phrase. The "comprises" and/or "comprising" as used in the specification do not exclude the presence or addition of one or more other constituent elements other than the mentioned constituent elements. Throughout the specification, the same reference numerals refer to the same constituent elements, and "and/or" includes each and all combinations of one or more of the mentioned constituent elements. Although "first", "second", etc. are used to describe various constituent elements, it is a matter of course that these constituent elements are not limited by these terms. These terms are only used to distinguish one constituent element from another constituent element. Accordingly, it goes without saying that a first constituent element mentioned below may be a second constituent element within the technical idea of the present invention.

The 'event' mentioned in this document may mean a motion in which an object is positioned or moved in a specific area in relation to the user's body. For example, the event may include an action of eating medicine or food, but is not limited thereto.

Figure 1:
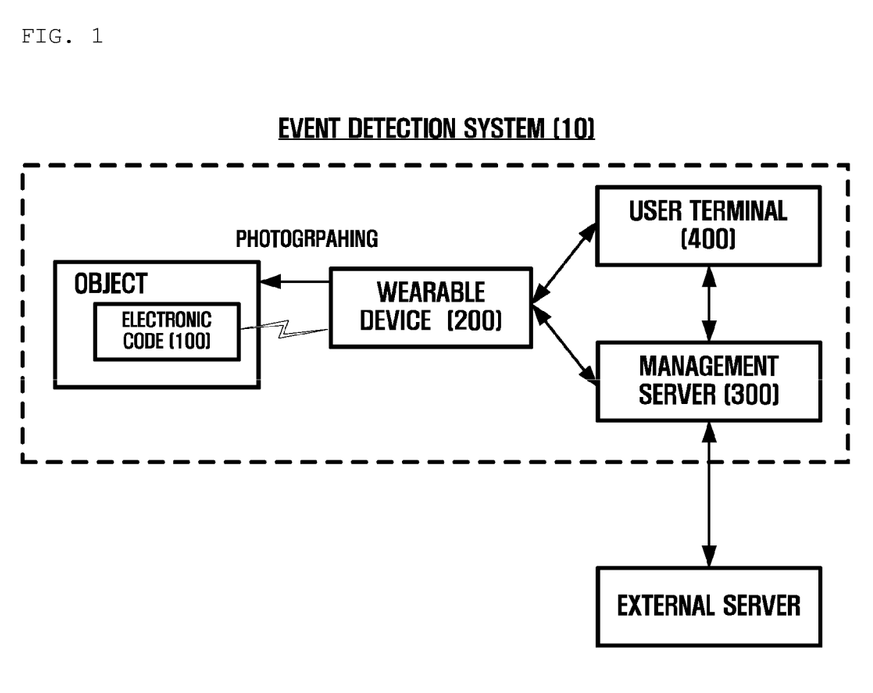
FIG. 1 is a schematic diagram of an event detection system according to an embodiment of the present invention.

FIG. 1 is a schematic diagram of an event detection system 10 according to an embodiment of the present invention. The event detection system 10 performs a function of recording time information by detecting whether a predetermined valid event occurs as a wearable device 200 recognizes an electronic code 100 attached to an object and photographs the object.

According to an embodiment, the event detection system 10 may include the electronic code 100, the wearable device 200, a management server 300, and a user terminal 400.

The electronic code 100 is attached to the object and recognized by the wearable device 200, thereby performing a function of allowing the wearable device 200 to recognize the object. The electronic code 100 may be implemented as, for example, a barcode, an RF tag, or a QR code, but is not limited thereto.

In the embodiment of the present invention, when the electronic code 100 is recognized by a short-range communication module of the wearable device 200, the wearable device 200 can determine whether or not to activate a camera module based on information on the object recognized through the electronic code 100.

The wearable device 200 is an electronic device wearable on at least a part of the user's body (e.g., wrist, etc.), and may be implemented as, for example, a smart watch, smart glasses, or a smart helmet, etc. but is not limited thereto. In the embodiment of the present invention, the wearable device 200 performs a role of recognizing the object through the short-range communication module, the camera module, or a sensor module, photographing an area adjacent to the wearable device 200, and transmitting the photograph to the management server 300. A detailed configuration of the wearable device 200 will be described later with reference to FIG. 2.

According to an embodiment of the present invention, the wearable device 200 may be configured as a smart watch wearable on the user's wrist. In this case, the camera module or sensor module included in the wearable device 200 may be positioned on a band connected to a case of the smart watch. For example, when the case of the smart watch is positioned on the wrist part connected to the back of the hand, the camera module or the sensor module may be placed on the band positioned on the wrist part connected to the palm. Through such a configuration, the wearable device 200 can detect or photograph a motion or event performed on the user's palm through the camera module or the sensor module.

The management server 300 performs a function of receiving information collected in the wearable device 200 by being connected to the wearable device 200 of the user through a network, analyzing the information, and determining whether a specific event has occurred. In addition, the management server 300 may transmit the collected or processed information to the user terminal 400 through the network. The management server 300 may include hardware information such as a control unit having at least one processor, a communication module, a storing unit (e.g., memory), or software information for algorithmic operation.

The user terminal 400 can perform a role of generating an initial setting value of the wearable device 200, changing a setting value, etc. by being connected to the wearable device 200 and such an operation can be performed according to an operation performed by the user on the user terminal 400. The user can access the management server 300 through the user terminal 400 to check information transmitted from the wearable device 200 that the user manages to the management server 300 and information processed by the management server 300 through such information.

The user terminal 400 according to an embodiment of the present invention can include all types of handheld-based wireless communication devices that can be connected to a web server through a network such as a mobile phone, a smart phone, a personal digital assistant (PDA), a portable multimedia player (PMP), a tablet PC, etc., and may be one of digital devices equipped with memory means such as a personal computer (e.g., a desktop computer, a notebook computer, etc.), a workstation, a PDA, a web pad, etc. and installed with a microprocessor to have capability of computation.

The external server is a device or that transmits and receives information (e.g., identification information for the electronic code 100, image information of an object corresponding to the electronic code 100, etc.) necessary for the management server 300 through the network, and a program.

Figure 2:
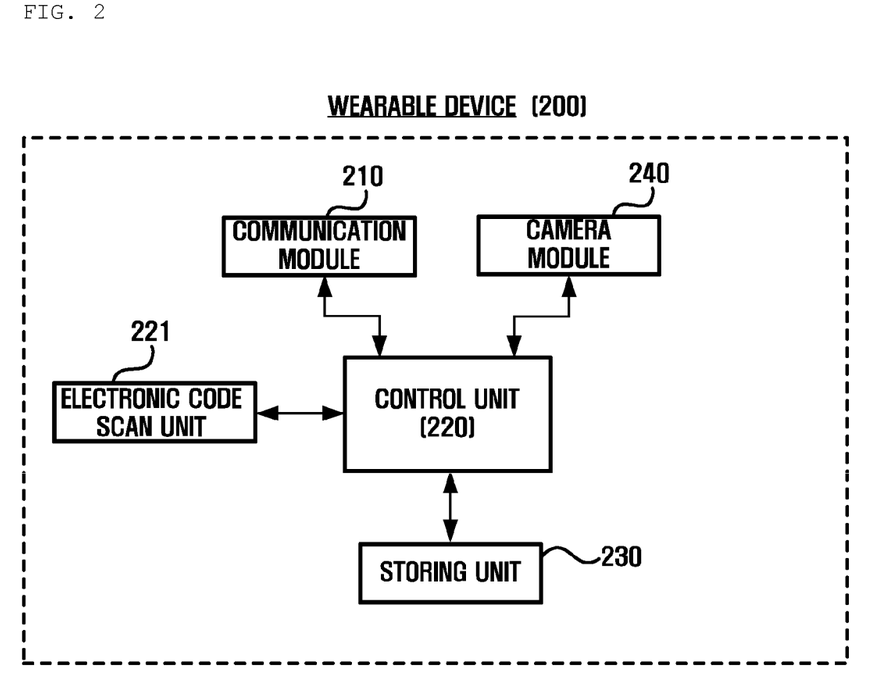
FIG. 2 is a block configuration diagram of a wearable device according to an embodiment of the present invention.

FIG. 2 is a block configuration diagram of the wearable device 200 according to an embodiment of the present invention. The wearable device 200 can include a communication module 210, a control unit 220, an electronic code scan unit 221, an object recognition unit 223, an event detection unit 225, a storing unit 230, and a camera module 240.

The communication module 210 performs a function of transmitting and receiving information necessary for the operation of the wearable device 200 by communicating with the electronic code 100 of the object, the management server 300, the user terminal 400 or an external server in the wearable device 200. The communication module 210 can be implemented as a short-range communication module such as a Bluetooth, Zigbee, infrared communication module, RF module, QR code module, or WIFI module, but can also be implemented in a long distance method such as a network communication module and a base station communication module.

The control unit 220 can control an overall operation such as power supply control of the wearable device 200 and a signal flow between internal configurations of the wearable device 200 and perform a data processing function of processing data. The control unit 220 can include at least one processor or MCU.

The control unit 220 can determine whether or not to activate the camera module 240 and control the operation of the camera module 240 accordingly. In addition, the control unit 220 can control the operation of the short-range communication module. According to an embodiment, the control unit 220 can control the short-range communication module to operate only within any preset time section.

The electronic code scan unit 221 may collect information generated by scanning the electronic code 100 attached to the object. The scanning method is scanned by various methods such as laser, RFID, Bluetooth, beacon, and QR code, and at least some configurations of the electronic code scan unit 221 may be included in the communication module 210.

The storing unit 230 can store data received or generated from the control unit 220, electronic code 100, wearable device 200, management server 300, user terminal 400, or other components of the event detection system 10. The storing unit 230 can include, for example, a memory, a cache, a buffer, etc., and can be configured with software, firmware, hardware, or a combination of at least two or more of them.

The camera module 240 photographs an area adjacent to the wearable device 200 and generates an image or a video related to at least one of movement of the user's body or an object. The camera module 240 can include a 2D or 3D camera device, and can include driving means (e.g., an actuator) for rotating or moving a lens of a camera.

According to an embodiment, the camera module 240 can be activated when the wearable device 200 recognizes an object through the communication module 210, or can be activated when a specific action of the user through the sensor module of the wearable device 200 is detected, but is not limited thereto, and can also be activated by other special conditions (e.g., the user arbitrarily selects an activation function). In a process in which the wearable device 200 detects the specific action of the user, the wearable device 200 may detect the specific action of the user based on a signal strength when the short-range communication module recognizes the object. Taking the case where the wearable device 200 recognizes the object using the electronic code 100 as an example, since the signal strength may be different depending on the distance between the wearable device 200 and the electronic code 100, the distance between the wearable device 200 and the object can be calculated based on the signal strength.

To this end, although not illustrated in FIG. 2, the wearable device 200 can further include a sensor module capable of recognizing a user's specific action as described above. The sensor module can include at least one sensor capable of measuring a physical quantity or detecting an operating state of the wearable device 200 and converting the measured or detected information into an electrical signal. Such a sensor module can include, for example, at least one of a GPS sensor, a gesture sensor, a gyro sensor, an air pressure sensor, a magnetic sensor, an acceleration sensor, a proximity sensor, a biometric sensor (such as an iris sensor, a fingerprint sensor, etc.), an infrared sensor, an ultraviolet sensor, a 9-axis sensor, or an illuminance sensor.

In FIG. 2 described above, subjects that perform respective roles in the wearable device 200 are displayed in the form of ~ units or ~ modules, but each of the parts may be subprogram modules or configuration obtained by functionally classifying the control unit 220 operating in the wearable device 200. These program modules are concepts encompassing routines, subroutines, programs, objects, components, data structures, etc. that perform each operation or execute a specific abstract data type, but are not limited thereto.

Figure 3:
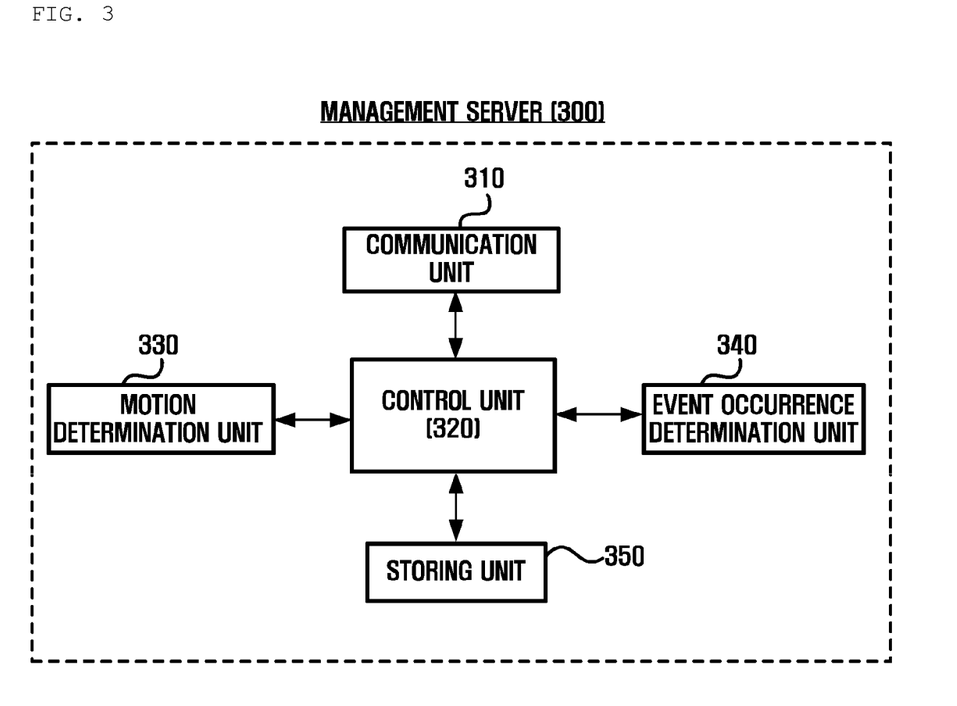
FIG. 3 is a block configuration diagram of a management server according to an embodiment of the present invention.

FIG. 3 is a block configuration diagram of the management server 300 according to an embodiment of the present invention. The management server 300 can include a communication unit 310, a control unit 320, a motion determination unit 330, an event occurrence determination unit 340, and a storing unit 350.

The communication unit 310 performs a function of transmitting and receiving information necessary for the operation of the management server 300 by the management server 300 communicating with the wearable device 200, the user terminal 400, or an external server.

The communication unit 310 can receive information of the object recognized by the wearable device 200 through the short-range communication module and the image or the video generated through the camera module 240 from the wearable device 200.

In addition, the communication unit 310 can transmit information on whether or not an event has occurred determined by the event occurrence determination unit 340 to the user terminal 400.

According to an embodiment of the present invention, the communication unit 310 may control the operation of the wearable device 200 by the management server 300 through real-time communication with the wearable device 200.

The control unit 320 can control an overall operation such as power supply control of the management server 300 and a signal flow between internal components of the wearable device 200 and perform a data processing function of processing data. The control unit 320 can include at least one processor or MCU.

The motion determination unit 330 can determine whether or not a preset motion is detected based on the object information, the image, or the video received by the communication unit 310. In detail, the motion determination unit 330 can determine whether a preset motion related to a corresponding object or a user's body is detected based on the object information, and such a determination can be performed based on machine learning or artificial intelligence.

In determining whether the preset motion related to the object or the user's body is detected, the motion determination unit 330 can determine whether the image or video corresponds to the preset motion related to the object or the user's body information, and such a determination can be performed on an image similarity discrimination technique.

According to an embodiment of the present invention, the preset motion related to the specific object or the user's body may be set differently for each object. For example, when a first object is recognized, a first motion and a second motion may be preset motions related to the user's body. When a second object is recognized, a third motion and a fourth motion may be preset motions related to the user's body.

According to an embodiment of the present invention, the object recognized through the electronic code 100 in the present invention can be a drug-related object, and the preset motion can be a situation related to a drug or drug ingestion action. For example, the object recognized through the electronic code 100 may be a container containing a drug. In this case, the preset motion may include exposure of the drug, a situation in which the container is opened, a situation in which the drug is held in the user's hand, a situation in which the drug is close to the user's mouth, etc.

The event occurrence determination unit 340 can perform a function of determining whether or not a specific event has occurred. In determining whether or not the specific event has occurred, the event occurrence determination unit 340 can determine whether or not the specific event has occurred by aggregating weights set for each of the preset motions detected by the operation determination unit 330.

For example, when the motion determination unit 330 determines that the first motion, the second motion, and the third motion, which are preset motions for the recognized specific object, are detected, the event occurrence determination unit 340 can determine whether or not the specific event occurs through a final operation by applying a preset weight value to the first operation, the second operation, and the third operation.

The storing unit 350 can store data received or generated from the control unit 320, the wearable device 200, the user terminal 400, or other constituent elements of the event detection system 10. The storing unit 350 can include, for example, a memory, a cache, a buffer, etc., and may be configured with software, firmware, hardware, or a combination of at least two or more of them.

The storing unit 350 can store machine learning or artificial intelligence related data used by the motion determination unit 330, and may also store data related to whether the specific event generated by the event occurrence determination unit 340 has occurred. In addition, the storing unit 350 stores information of the wearable device 200 and the user terminal 400, and can store whether or not a specific wearable device 200 is a device associated with which user terminal 400.

Figure 4:
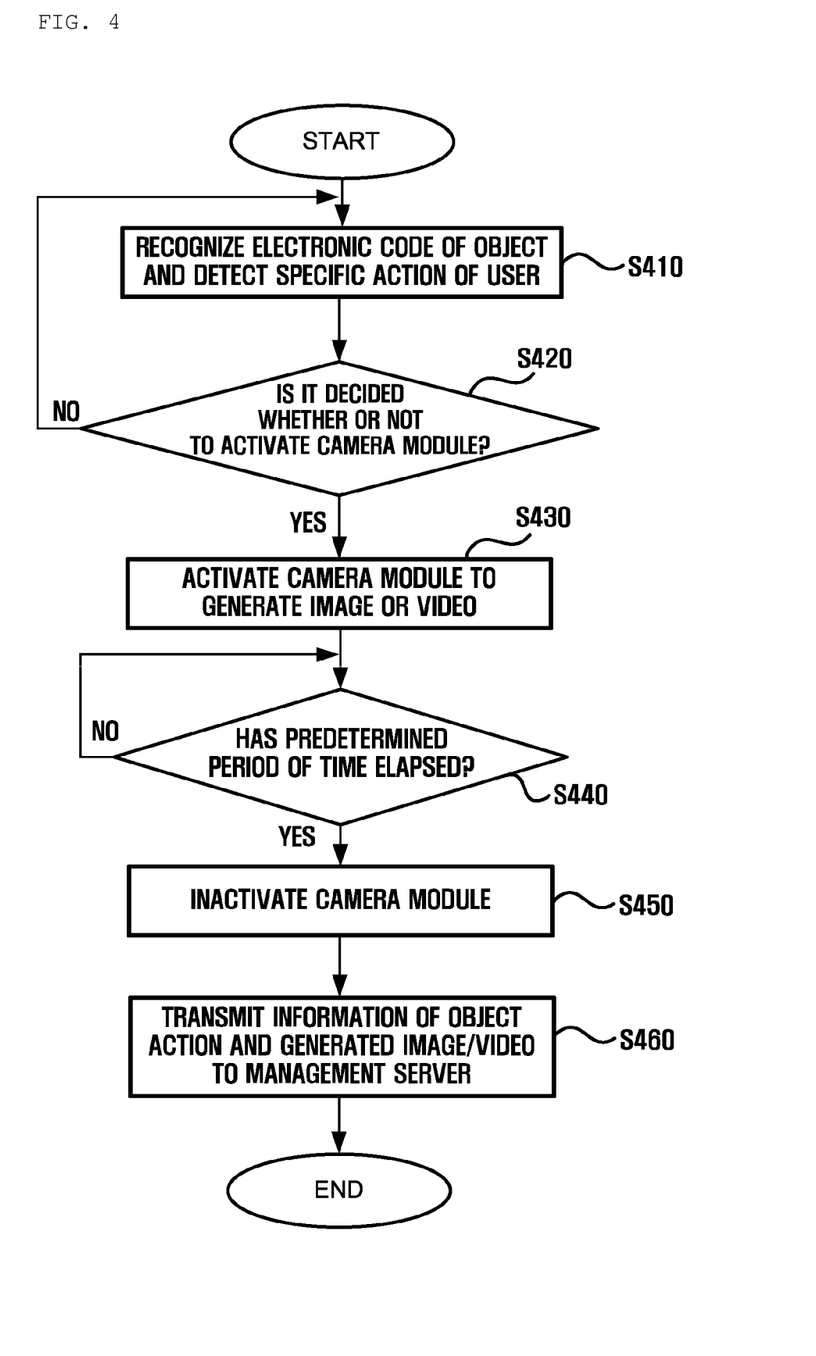
FIG. 4 is a flowchart illustrating an operation of detecting an object and generating an image or a video in the wearable device according to the embodiment of the present invention.
Figure 5:
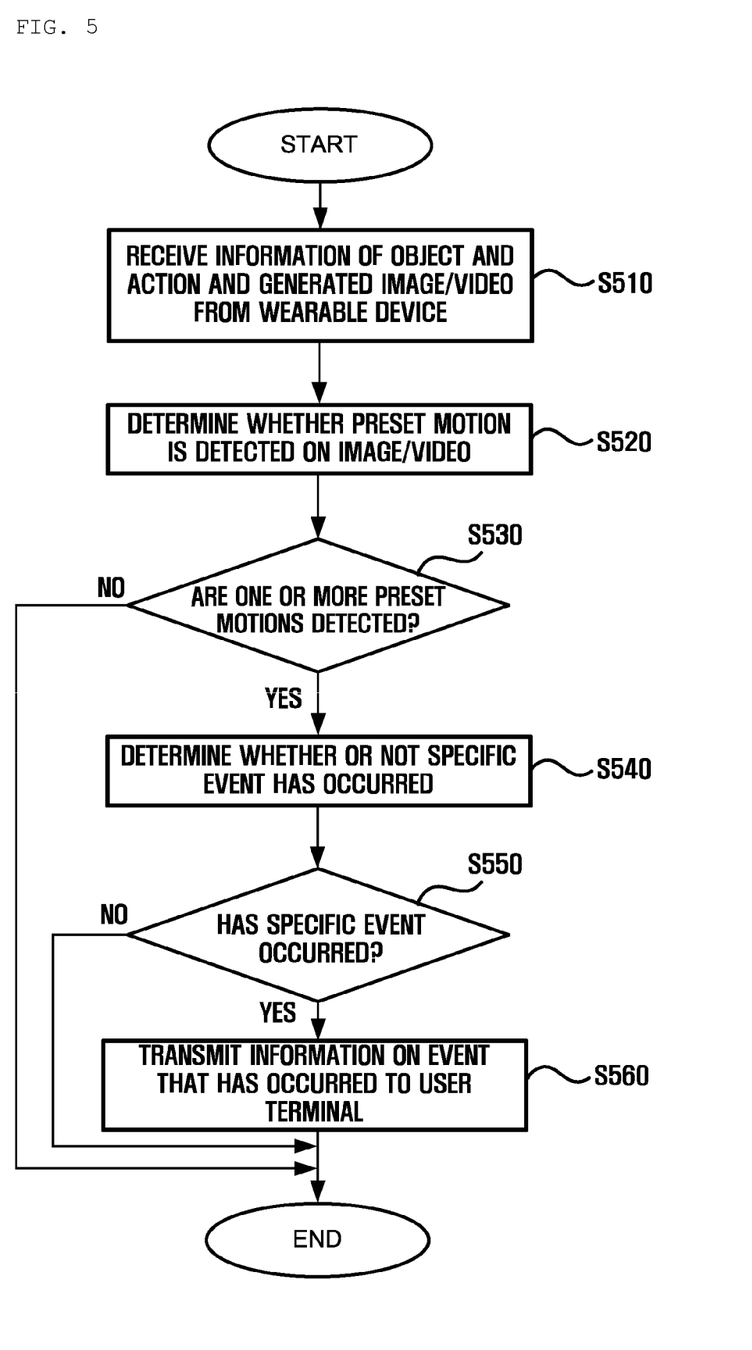
FIG. 5 is a flowchart illustrating an operation of managing information received from the wearable device and determining whether a specific event has finally occurred in the management server according to an embodiment of the present invention.

In FIGS. 4 to 5 below, an operation of receiving information and determining whether or not an event has occurred in the management server 300 when the wearable device 200 detects an object and generates an image or a video with the camera module through the configuration as in FIGS. 1 and 2 will be described in detail. At least some of steps of FIGS. 4 to 5 may be omitted or may be changed in order with each other.

FIG. 4 is a flowchart of an operation of detecting an object and generating an image or a video in the wearable device 200 according to an embodiment of the present invention.

When the user comes close to the object, the wearable device 200 can recognize the electronic code 100 (S410), and in this case, the wearable device 200 may detect a specific action of the user (S410).

Thereafter, the control unit 220 of the wearable device 200 can decide whether or not to activate the camera module 240 through information of the recognized object or information of the detected user's action (S420). For example, if there is a situation in which the user is performing a repetitive action and accordingly the object is being repeatedly recognized through a sensor module, the wearable device 200 may not determine this as an action for a corresponding object and may not activate the camera module 240.

When the control unit 220 decides not to activate the camera module 240, the wearable device 200 can return to a state in which recognition of the electronic code 100 or detection of the specific behavior is performed.

In contrast, when the control unit 220 decides to activate the camera module 240, the control unit 220 can activate the camera module 240 to generate an image or a video through photographing (S430).

Thereafter, the control unit 220 can determine whether a predetermined period of time has elapsed (S440), and when the predetermined period of time has elapsed, the control unit 220 can control the camera module 240 to be in an inactive state (S450). According to an embodiment of the present invention, such a predetermined period of time may be measured from the time when the camera module 240 is activated, and when the wearable device 200 recognizes the electronic code 100 of the object or additionally detects the specific action of the user in a state where the camera module 240 is activated, the time being measured may be reset and the time during which the camera module 240 is activated may be extended.

After the camera module 240 is inactivated, the wearable device 200 can transmit information of the recognized object, information of the detected specific action of the user, and the image or the video generated by the camera module 240 to the management server 300 (S460).

According to an embodiment of the present invention, in a situation where the wearable device 200 is not connected to a communication network, the information of the recognized object, the information of the detected specific action of the user, and the image or the video generated by the camera module 240 can be temporarily stored in the storing unit 230 in the wearable device 200, and when the wearable device 200 is connected to a wireless communication network later, the various types of data listed above can be transmitted to the management server 300.

FIG. 5 is a flowchart illustrating an operation of managing information received from the wearable device 200 and determining whether a specific event has finally occurred through this, in the management server 300 according to an embodiment of the present invention. In FIG. 5, similarly to the contents of FIG. 4, at least some of steps may be omitted or may be changed in order with each other.

When the wearable device 200 transmits the image or the video generated in relation to the object information and the specific action of the user, together with the object information and the specific action of the user in step S460 of FIG. 4, the management server 300 can receive them (S510).

Thereafter, the management server 300 can determine whether or not a preset motion related to an object or a user's body is detected on the received image or video based on machine learning or artificial intelligence (S520).

As a result of the determination in step S520, the management server 300 determines whether one or more preset motions in relation to the corresponding object are detected (S530), and when one or more preset motions are detected, the management server 300 can determine whether or not a specific event has occurred based on this (S540). When it is determined that the specific event has occurred, the management server 300 can transmit information on the event that has occurred to the user terminal 400 (S560).

Figure 6:
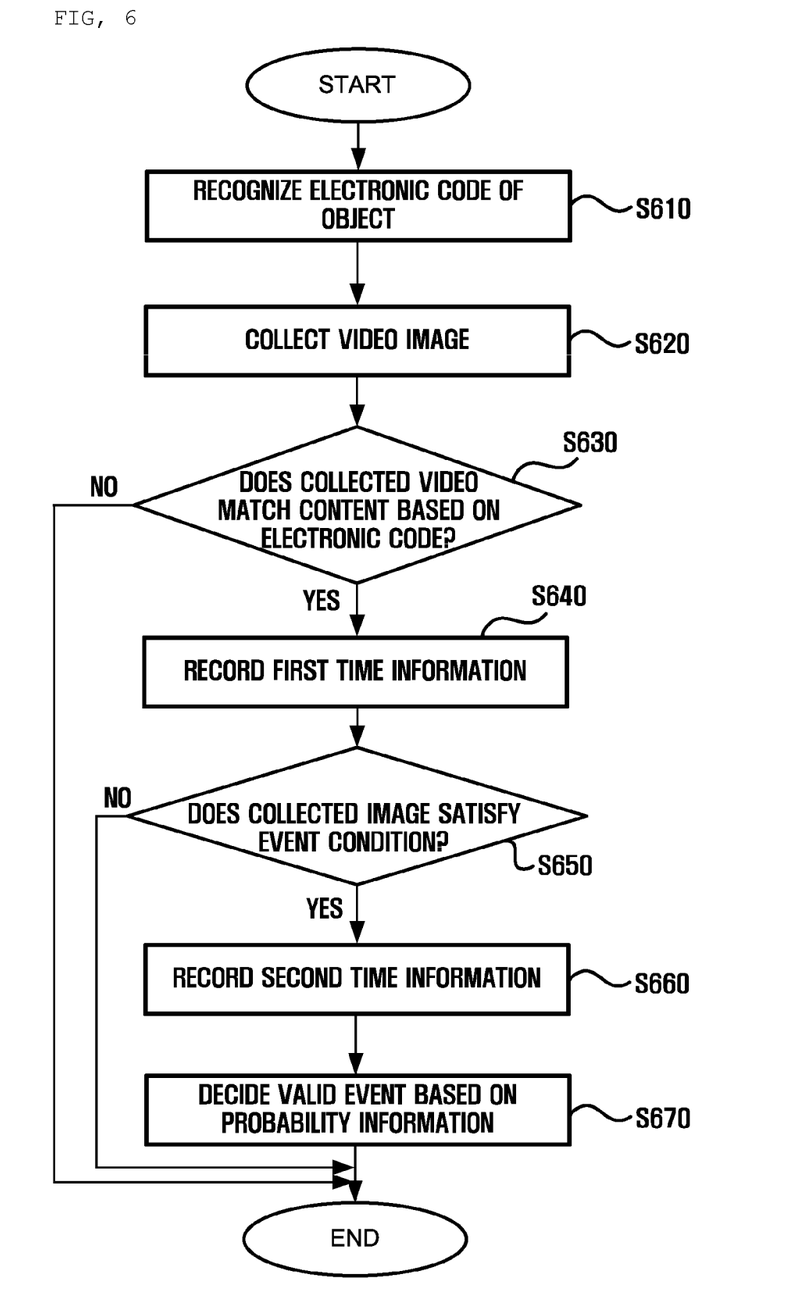
FIG. 6 is a flowchart illustrating an operation of detecting an event of an object in a wearable device according to another embodiment of the present invention.
Figure 7:
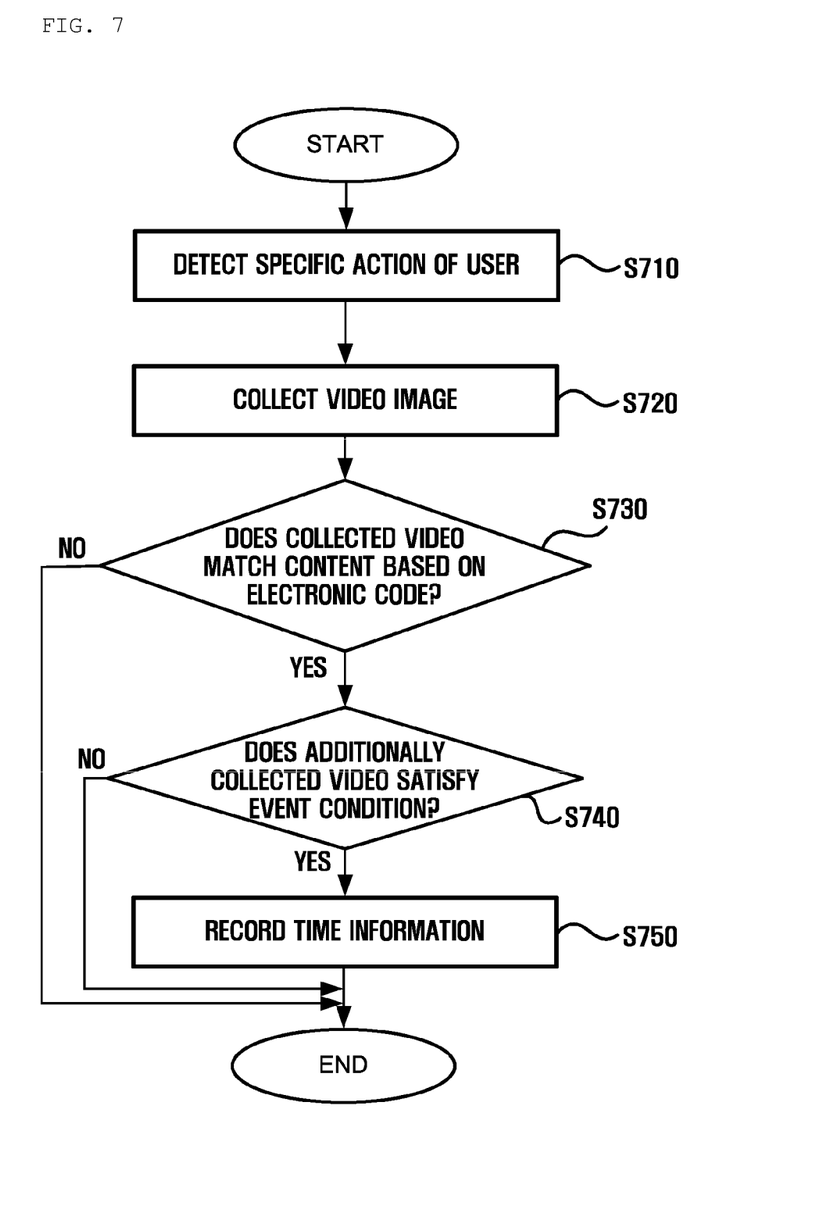
FIG. 7 is a flowchart illustrating an operation of detecting the event of the object in a wearable device according to another embodiment of the present invention.

In FIGS. 6 to 7 below, an operation of detecting an event of an object in the wearable device 200 through the same configuration as in FIGS. 1 and 2 will be described in detail. In the embodiment described through FIGS. 6 and 7, different from those described through FIGS. 4 and 5, the detection and determination of motions and events can be performed on the wearable device 200 other than the management server 300.

At least some of the steps of FIGS. 6 to 7 may be omitted or may be changed in order with each other.

FIG. 6 is a flowchart of an operation of detecting the event of the object in the wearable device 200 according to an embodiment of the present invention.

When the user comes close to the object, the wearable device 200 recognizes the electronic code 100 (S610) and collects a video image of the object through the camera module 240 of the wearable device 200 (S620). For example, if an electronic code is written or attached to a specific medicine wrapper and the user holds the medicine wrapper with the wearable band attached to the wrist, the communication module of the wearable band scans the electronic code and recognizes an object called "medicine". Accordingly, the camera module 240 of the wearable device 200 is activated to photograph the medicine to collect a corresponding video image.

Then, the wearable device 200 can check the content (e.g., an image of the corresponding medicine) corresponding to the scanned object (e.g., medicine) through the local storing unit 230 or the management server 300, and compares the checked content with the image collected through the photographing or image-capturing and determines whether the collected video image matches the checked content (S630).

According to an embodiment, the matching determination operation in step S630 may be performed through a first discrimination algorithm using the image similarity discrimination technique. For example, the control unit 220 may divide areas such as color and texture of the video collected through photographing and the video checked through scanning, and determine an image similarity through a matching operation, etc. based on location information and a color table or object similarity. The first discrimination algorithm may include various image similarity determination techniques and is not limited to a specific technique.

In addition, a method of determining whether a match is made may be determined by whether or not a similarity numerical value derived through the similarity operation is equal to or greater than a predetermined threshold value. The similarity numerical value may be derived during the image similarity determination process. If the similarity numerical value is equal to or greater than the predetermined threshold, the control unit 220 can determine that the photographed image and the image checked according to electronic code scanning are matched, and record time information at this time as first time information (S640). Accordingly, the first time information may be information of the time at which it is checked whether the specific object is an object for monitoring event occurrence.

According to an embodiment, the first time information may be used, for example, as metadata for analyzing event occurrence data, or as information for analyzing user patterns. As a non-limiting example, when a time difference between the first time information and second time information to be described later differs by a predetermined value or, the second time information may be determined as error data in some cases. For example, this is because, if the user has touched the medicine, but the medicine is recognized as being taken to the mouth only after several hours have passed, an error can occur in determining that the recognized medicine has been taken. However, recording of the first time information may be omitted.

In addition, the control unit 220 may calculate the similarity numerical value as probability information of the first discrimination algorithm. The probability information of the first discrimination algorithm can be used to probabilistically determine whether an event is a valid event to be described later, and to secure reliability for accumulated data.

On the other hand, if the matching in step S630 is not satisfied, the operation in FIG. 3 can be ended or waited in an idle state to recognize the electronic code of a new object.

Next, the control unit 220 can additionally collect a video of the object and determine whether the collected video satisfies an event condition (S650). According to an embodiment, the event condition may be a condition for checking whether a preset motion related to a user's body is detected with respect to the object. For example, the control unit 220 may check whether a medicine taken out by the user enters a mouth that is a part of the user's body. This checking operation may be derived by applying a second discrimination algorithm based on machine learning or an algorithm. For example, the control unit 220 can recognize a specific body called 'mouth' using a known image analysis technique using machine learning, and check whether the object is close to the user's mouth within a predetermined distance through the photographed image collected.

If the collected video satisfies the event condition, the control unit 220 can record the time point at which the video was collected as second time information (S660). For example, the control unit 220 can record a time point at which the medicine enters the user's mouth or a time point within a predetermined error range from the time point as the second time information. The second time information may be directly determined as the event occurrence time of the object, but may be determined by whether it is a valid event after determining whether or not a specific condition is satisfied in advance. The valid event may mean an event arbitrarily selected by the user to record time information among events occurring in a corresponding object.

In addition, the control unit 220 can derive, as a numerical value, whether the preset motion related to the user's body is detected through the second discrimination algorithm as described above, and can calculate this as probability information of the second discrimination algorithm. Like the probability information of the first discrimination algorithm described above, the probability information of the second discrimination algorithm can also be used to probabilistically determine whether the event occurring in the corresponding object is the valid event.

Next, the control unit 220 can finally decide whether or not the event is the valid event based on the probability information (S670). Specifically, the control unit 220 can determine that the valid event has occurred when the probability information of the first discrimination algorithm and the probability information of the second discrimination algorithm are summed up and exceeds a predetermined value, and decide the second time information as a valid event occurrence time. For example, the control unit 220 may numerically convert whether the object is an object (e.g., medicine) targeted for monitoring, numerically convert whether a predetermined event (e.g., an action that approaches the mouth) occurs for the object, and determine it as a valid event only when a value obtained by the adding the numerically converted values is greater than or equal to the predetermined value.

In this case, the control unit 220 may impose a higher weight on the probability information of the second discrimination algorithm than the determination information of the first discrimination algorithm. This is because, in the event occurrence condition, what kind of movement occurred in the object may be more important than whether or not it is an actual object, and the process of checking whether the event condition is satisfied may be accompanied by the process of recognizing the corresponding object. However, the step S670 described above may be omitted, and the second time information can be simply determined as the valid event occurrence time.

Meanwhile, the video images, time information, and probability information collected, recorded or calculated in FIG. 3 may be automatically transmitted to the management server 300 in real time, periodically or at any time point. The management server 300 can provide a guide (e.g., a notification) to a user in various ways based on the collected information, or provide information for establishing a more improved policy through data analysis.

FIG. 7 is a flowchart of an operation of detecting an event of an object in the wearable device 200 according to another embodiment of the present invention. Among the contents of FIG. 7, contents redundant with the contents of FIG. 6 may be omitted or simplified. In FIG. 7, similarly to the contents of FIG. 6, at least some of steps may be omitted or may be changed in order with each other.

In FIG. 7, the camera module 240 may be activated on the condition that a specific action of the user is recognized instead of step S610 of FIG. 6 described above according to some embodiments. To this end, the control unit 220 can detect the specific action of the user through the sensor module, the camera module 240 or the communication module 210 (S710). The specific action of the user includes a unique movement of the user's body, and for example, a motion of a hand on which the wearable device 200 is worn to bring food to the mouth when eating food, etc. can be detected. In this case, when a sensor value corresponding to a predetermined value is collected so that the specific action of the user can be recognized through the sensor module, or when it corresponds to a specific pattern by analyzing the collected sensor value, the control unit can set that the specific action is recognized, but is not limited thereto.

When the specific action of the user is detected as described above, the control unit 220 can activate the camera module 240 to collect the video image (S720), and then record time information through an image check operation of the object (S730) and an event condition fulfillment operation (S740) in the same as or similar to the contents of FIG. 3 (S750). As illustrated in FIG. 6, the function of dividing time information into the first time information and the second time information and the function of determining the valid event based on probability information may be omitted in FIG. 7, but unlike this, the contents described above in FIG. 6 may be performed in the same manner.

Through the embodiments of FIGS. 1 to 7 described above, by recording whether or not the specific event occurs and the occurrence time by the wearable device 200, a more efficient guide system may be provided by detecting the event of the user that is likely to be omitted in a field such as healthcare, and a system capable of analyzing data by learning a user pattern, etc. may be implemented.

The steps of the method or algorithm described in relation to the embodiments of the present invention may be implemented directly in hardware, implemented as a software module executed by hardware, or a combination thereof. The software module may reside in a random access memory (RAM), read only memory (ROM), erasable programmable ROM (EPROM), electrically erasable programmable ROM (EEPROM), flash memory, hard disk, removable disk, CD-ROM, or any type of computer-readable recording medium well known in the art to which the present invention pertains.

In the above, although embodiments of the present invention have been described with reference to the accompanying drawings, those skilled in the art to which the present invention pertains will be able to understand that the present invention can be implemented in other specific forms without changing the technical spirit or essential features thereof. Therefore, the embodiments described above are illustrative in all respects, and should be understood as non-limiting.

The invention claimed is:

1. A server for determining whether a medication adherence event has occurred using a video, wherein the video is recorded by a wearable device, the server comprising:
 a server communication unit communicating with the wearable device;
 a server memory storing a medication adherence event determination algorithm; and
 a server control unit configured to:
 obtain the video via the server communication unit, and
 by applying the medication adherence event determination algorithm to the obtained video, check probability information of an object and an action included in the video, and determine whether the medication adherence event has occurred based on the checked probability information of the object and the action, wherein the object and the action are related to medication adherence, the video includes a plurality of video images, and at least a part of the plurality of video images includes at least a portion of a user's palm,
 wherein the object related to the medication adherence includes at least one selected from the group of a drug and a drug container,
 wherein the action related to the medication adherence includes at least one selected from the group of an action of holding a drug container, an action of opening a drug container and an action of ingesting a drug, and
 wherein the server control unit is further configured to:
 to check the probability information of the object and the action, check the probability information of the action after checking the probability information of the object,
 when a first object is recognized according to the probability information of the object, check the probability information of a first action corresponding to the first object, and
 when a second object is recognized according to the probability information of the object, check the probability information of a second action corresponding to the second object.

2. The server of claim 1, wherein the server control unit is further configured to:
 when the first object is recognized, determine whether the medication adherence event has occurred based on the probability information of the first action, and
 when the second object is recognized, determine whether the medication adherence event has occurred based on the probability information of the second action.

3. The server of claim 1,
 wherein the medication adherence event determination algorithm includes a first algorithm and a second algorithm,
 wherein the first algorithm is designed to checks the probability information of the object and the action based on at least one of the plurality of video images, and
 wherein the second algorithm is designed to determines whether the medication adherence event has occurred based on the checked probability information of the object and the action and time information of the at least one of the plurality of video images.

4. The server of claim 1, wherein the server control unit is further configured to:

when an occurrence of the medication adherence event is determined by applying the medication adherence event determination algorithm to the video, transmit medication adherence event occurrence information to the wearable device via the server communication unit.

5. A system comprising the server of claim 1 and the wearable device, wherein the wearable device comprises:
a first wearable communication module receiving object information related to a medication object located in a predetermined region from the wearable device;
a camera module generating the video;
a wearable control unit configured to determine whether to activate the camera module based on the object information received through the first wearable communication module, and when the activation of the camera module is determined, perform video recording for a predetermined time interval to generate the video; and
a second wearable communication module transmitting at least one selected from the group of the object information received through the first wearable communication module and the video generated by the camera module to the server.

6. The system of claim 5, wherein the wearable control unit is further configured to:
recognize the medication object using the object information, and
wherein when a first object is recognized and the first object is recognized again within a first time interval, control the camera module to be in an inactive state.

7. The system of claim 5, wherein the wearable control unit is further configured to:
recognize the medication object using the object information, and
wherein when a first object is recognized and a second object is recognized within a first time interval, control the camera module to be in an active state.

8. The system of claim 5, wherein the wearable control unit is further configured to:
recognize the medication object using the object information,
when the first object is recognized, control the camera module to record the video for a second time interval, and
when a second object is recognized, control the camera module to record the video for a third time interval longer than the second time interval.

9. The system of claim 5, wherein the wearable control unit is further configured to determine whether to activate the camera module based on a signal strength when receiving the object information by the first wearable communication module.

10. The system of claim 5, wherein the wearable control unit is further configured to control the second wearable communication module to operate within a certain time interval.

* * * * *